July 18, 1933.  E. F. ROSSMAN  1,918,565

SHOCK ABSORBER

Filed April 2, 1930

Inventor
Edwin F. Rossman
By Spencer, Hardman and Fehr
His Attorneys

Patented July 18, 1933

1,918,565

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

SHOCK ABSORBER

Application filed April 2, 1930. Serial No. 440,952.

This invention relates to improvements in hydraulic shock absorbers.

It is among the objects of the present invention to provide a hydraulic shock absorber adapted to control both the approaching and separating movements of two relatively movable members, for instance the frame and axle of a vehicle.

A further object of the invention is to provide a double acting shock absorber of simple structure and design, capable of being produced commercially at a minimum expenditure of time and material.

Further objects and advantages of the present invention will be apparent from the following description, reference being had to the accompanying drawing wherein a preferred embodiment of one form of the present invention is clearly shown.

Figure 1:
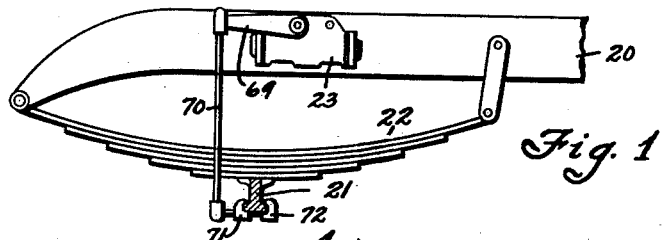
Fig. 1 is a fragmentary side view of the vehicle chassis, a shock absorber embodying the present invention being shown applied thereto.

Referring to the drawing, the numeral 20 designates the frame of the vehicle which is supported upon the axle 21 by springs 22, only one of which is shown. The shock absorber comprises a casing 23, presenting a fluid reservoir 24 and a cylindrical portion 25. The two open ends of the cylindrical portion 25 are closed by the screw plugs 26 and 27, properly gasketed to eliminate leaks.

Figure 4:
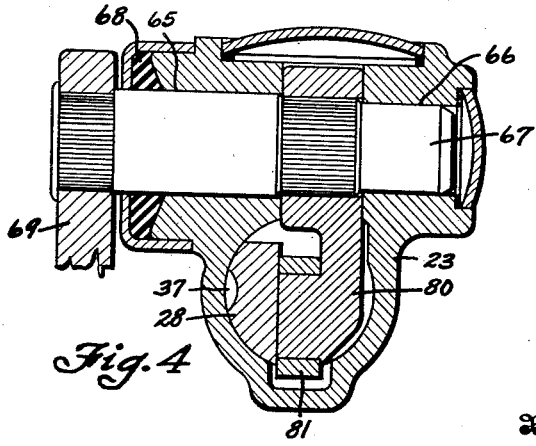
Fig. 4 is a transverse sectional view taken along the line 4—4 of Fig. 2.

Within the cylindrical portion 25 of the casing 23 there is provided a fluid displacement member 28 having a central recess 29 which forms two piston head portions 30 and 31 tied together by an intermediate web portion 32. The fluid displacement member 28 forms a compression chamber at each end of the cylindrical portion 25, the piston head portion 30 forming the compression chamber 33, while the piston head portion 31 forms the compression chamber 34. The ends of the fluid displacement member are recessed, the recess in the piston head portion 30 being designated by the numeral 35, while the recess in the piston head portion 31 is designated by the numeral 36. In the outer surface of the fluid displacement member there is provided a longitudinal channel 37 which terminates short of the ends of said displacement member. A duct 38 in the fluid displacement member connects the recess 35 of the piston head portion 30 with the channel 37, while a similar duct 39 connects the recess 36 of the piston head portion 31 with said channel 37. This channel 37 as shown in Fig. 4 is so located on the fluid displacement member 28 that it cooperates with the inner wall of the cylindrical portion 25 to form a closed low pressure passage. By "closed" is meant that this low pressure passage is not in communication with the fluid reservoir 24, but only in communication with the compression chambers 33 and 34 through the respective ducts 38 and 39 and recesses 35 and 36.

The inner ends of the recesses 35 and 36 have reduced portions 40 and 41 respectively. Within the recess 35 there is provided an annular ridge 42 extending toward the outer end of the recess and surounding the reduced end portion 40 of said recess. A similar ridge portion 43 is provided in the recess 36 surrounding the smaller portion 41 of said recess. These ridges 42 and 43 form annular valve seats within said recesses.

In each recess 35 and 36 there is provided a valve mechanism adapted to control the flow of fluid through the respective ducts 38 and 39. Inasmuch as the valve mechanisms for the respective recesses are alike, only one of them will be described for the sake of brevity.

Figure 3:
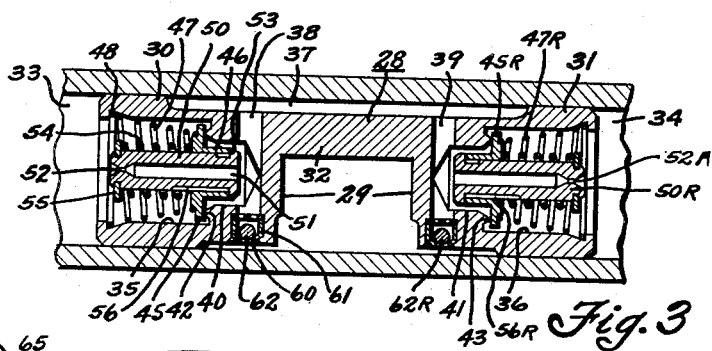
Fig. 3 is a detail sectional view taken along the line 3—3 of Fig. 2, certain parts being omitted for the sake of clearness.

The valve mechanism comprises a ring-shaped valve 45 having a cylindrical extension 46 which reaches into the smaller diameter portion 40 of the recess 35. One end of a coil spring 47 is secured to the ring-shaped valve 45 in any suitable manner, the other end of said spring being secured in an annular groove 48 provided within the recess 35 adjacent the outer end thereof. This spring 47 not only yieldably urges the valve 45 into engagement with the annular valve seat 42, but it also substantially maintains said valve 45 in proper coaxial alignment with the recess portion 40 whereby the valve may properly engage the valve seat to shut off the recess 35 from its portion 40. The valve mechanism also comprises a tubular valve member 50 slidably supported within the ring-shaped valve 45 and its cylindrical extension 46. The longitudinal passage 51 through the valve 50 has a reduced portion 52 providing a fluid restricting orifice. The tubular valve 50 has a head portion 53 engaging the inner end of the cylindrical extension 46 of the ring-shaped valve 45. A spring 54 has one end engaging the ring-shaped valve 45, the other a washer 55 secured at the outer end of the tubular valve 50, said spring urging the tubular valve 50 so that its head portion 53 is yieldably maintained in engagement with the inner edge of the cylindrical extension 46. A slot 56 is provided in the outer surface of the tubular valve 50 and extends from the inner edge of its head portion 53 a substantial distance beyond the confines of the ring-shaped valve 45 as shown in the Fig. 3.

Duct 38, as has been mentioned, opens into the longitudinal channel 37 of the fluid displacement member 28. The other end of said duct 38 opens into a channel 60 provided in the piston which in turn is in communication with the recess 29 thereof, said recess being in communication with the fluid reservoir 24. In the end of the duct 38 communicating with the channel 60 there is provided a check valve comprising the valve cage 61 and the ball check valve 62. This check valve prevents the flow of fluid from the duct 38 into the fluid reservoir through channel 60. However check valve 62 will be moved to establish a flow of fluid from the reservoir into the duct 38 to compensate for any fluid losses in the compression chamber 33 which might obtain through leakage past the piston or in any other manner.

The casing 23 presents two aligned, but oppositely disposed bearings 65 and 66 in which the rocker shaft 67 of the shock absorber is journalled. One end of this rocker shaft extends outside the casing, a packing gland 68 substantially preventing fluid leaks from the inside of the casing along said rocker shaft past the bearing 65. The shaft portion 67 extending outside the casing has the shock absorber operating arm 69 secured thereto, the free end of the arm being swivelly attached to one end of the connecting link 70. The opposite end of this connecting link is secured to a bracket 71 which is clamped to the axle 21 by the member 72.

A rocker lever 80 is attached to the shaft 67 within the casing 23, said rocker lever carrying a shoe 81 having parallel ends which fit into and engage the side walls of the recess 29 in the fluid displacement member 28.

Figure 2:
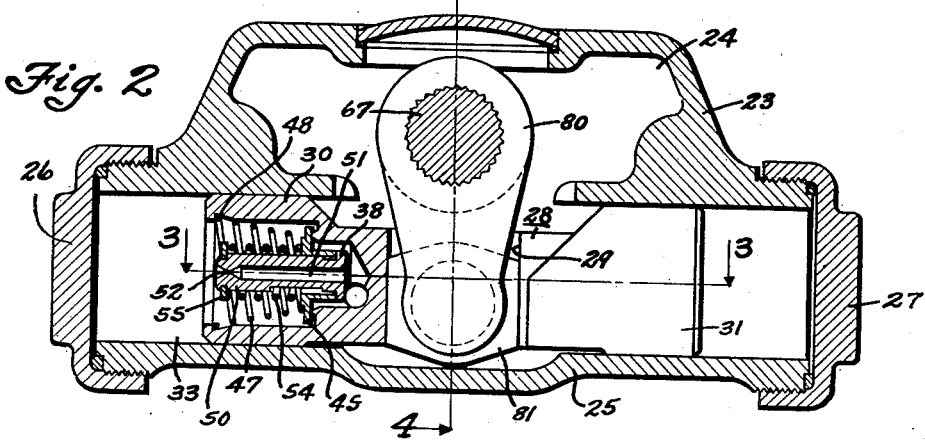
Fig. 2 is a longitudinal sectional view taken through the shock absorber.

The device operates in the following manner:

When the wheels of the vehicle, not shown, strike an obstruction in the roadway, springs 22 will be flexed toward the frame 20, resulting in an upward movement of the link 70 and thereby a clockwise rotation of the shock absorber operating arm 69. Rotating the arm 69 clockwise will likewise rotate the shaft 67 clockwise, and thus the rocker arm 80 will be moved toward the left as regards Figs. 2 and 3. The fluid displacement member in being moved toward the left will cause the fluid within the compression chamber 33 to have pressure exerted thereupon, the initial escape of the fluid from said compression chamber 33 being through the orifice 52 and passage 51 into the duct 38 and thence into the channel 37. From this channel the fluid will flow from the duct 39 and thence into the recessed portion 41 against the valve 45R, pushing said valve from its valve seat 43 against the effect of the spring 47R and thus establishing a flow from the duct 39 into the compression chamber 34.

This initial escape of fluid from the compression chamber 33 will be restricted by the orifice 52, said restriction to the flow of fluid from the compression chamber 33 resisting the movement of the fluid displacement member toward the lever and consequently resisting the upward or compression movement of the spring 22. If the obstruction met is of sufficient size to cause excessive pressure within the compression chamber 33 which cannot be sufficiently relieved by the flow through the orifice 52, then the excessive pressure acting upon the end of the tubular valve 50 will move said valve 50 to the right relative to the ring-shaped valve 45 in Figs. 2 and 3. This will move the head 53 of the tubular valve 50 away from the edge of the cylindrical extension 46 of the ring-shaped valve, and thereby another restricted flow of fluid will be established from the recess 35 through the slot 56 in valve 50 past the head portion 53 thereof into the duct 38 and thence through channel 37 and duct 39 past the valve 45R into the compression chamber 34. The movement of the valve 50 relative to the valve 45 will be in accordance with the pressure within the compression chamber 33, and consequently the restriction to the flow of fluid will be in accordance with the degree of pressure exerted upon the fluid in said compression chamber.

When the spring 22 has reached the limit of its flexure caused by this particular obstruction, the tendency of said spring is suddenly to return to normal, unflexed position with a rebounding movement which, if permitted, will result in disagreeable jars and jolts being transmitted to the frame of the vehicle. The present device substantially controls the return of the spring towards its relaxed or normal position for, as said spring begins to move away from the frame 20, the connecting link 70 will rotate the arm 79 counter-clockwise, resulting in a movement of the fluid displacement member toward the right as regards Figs. 2 and 3. In this instance valve 50R with its orifice 52R and its fluid passage slot 56R will function in a manner substantially similar to the corresponding valve in the opposite end of the fluid displacement member. Restriction of the flow of fluid from the compression chamber 34 into the duct 39 and channel 37 will resist the return movement of the springs 22 and thus substantially eliminate the rebounding thereof. The ball check valve 62R will function also to replenish the fluid supply in compression chamber 34 if for any reason any of the fluid therein has been lost due to leaks or the like.

In this invention applicant provides a shock absorber having two compression chambers which, during the operation of the device discharges from one into the other without in any way sending the fluid into the fluid reservoir. The valve mechanism at one end of the fluid displacement member operates independently of the valve mechanism at the opposite end of the fluid displacement member, likewise one valve mechanism may be adjusted to control its cycle of shock absorber operation without in any way affecting the valve mechanism which controls another cycle of shock absorber operation. In this instance the working medium is kept separate from that of the supply, thereby insuring substantially continuous and efficient operation.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a cylinder; a piston in said cylinder forming a compression chamber at each end thereof, said piston having a recess in each end thereof, a duct leading from the inner end of each recess to the outer, peripheral surface of the piston and a channel in said surface of the piston cooperating with the wall of the cylinder to form a passage connecting the two ducts of the two piston recesses; an annular ridge in each piston recess surrounding the mouth of the duct leading thereinto; a disc valve yieldably urged into engagement with said annular ridge, said valve having a central channel; a stem-valve slidably supported in the central channel of the disc valve and having a head portion engaging the side of the disc valve which engages the annular ridge; a spring yieldably urging said stem-valve to maintain its head portion in engagement with the disc-valve; a slot in the outer surface of the stem-valve extending from the inner surface of the head portion a distance substantially greater than the thickness of the disc-valve; and means for reciprocating said piston.

2. A shock absorber comprising in combination, a casing presenting a cylinder; a piston in said cylinder forming a compression chamber at each end thereof; said piston having a recess in each end thereof; a duct leading from the inner end of each recess to the outer, peripheral surface of the piston and a channel in said surface of the piston cooperating with the wall of the cylinder to form a passage connecting the two ducts of the two piston recesses; an annular ridge in each piston recess surrounding the mouth of the duct leading thereinto; a ring-shaped valve yieldably urged into engagement with the annular ridge, said valve having a tubular portion extending into the respective duct; a tubular valve member slidably carried by the tubular portion of the ring-shaped valve, said tubular valve having a head engaging the end of said tubular portion within the duct; a spring yieldably urging the head of the tubular valve into engagement with the ring-shaped valve; a slot in the outer surface of the tubular-valve extending from the inner side of the head thereof a substantial distance beyond the outer edge of the ring-shaped valve; and means for reciprocating said piston.

3. A shock absorber comprising in combination, a casing presenting a cylinder; a piston in said cylinder forming a compression chamber at each end thereof, said piston having a recess in each end thereof, a duct leading from the inner end of each recess to the outer, peripheral surface of the piston and a channel in said surface of the piston cooperating with the wall of the cylinder to form a passage connecting the two ducts of the two piston recesses; an annular ridge in each piston recess surrounding the mouth of the duct leading thereinto; valve-mechanism in each piston recess for controlling the flow of fluid through the respective ducts, each valve mechanism comprising a ring shaped valve; a spring secured at one end to the valve and at the other end to the piston, said spring yieldably supporting said valve and urging it into engagement with the annular ridge, said ring-shaped valve having a cylindrical extension reaching into the respective duct, a tubular valve slidably carried within the cylindrical extension of the ring-shaped valve, said tubular valve having a metering orifice within it and a head member at one end engaging the inner end of the cylindrical extension of the ring-shaped valve, said tubular valve having also a longitudinal slot in its outer surface extending from the inner edge of its head member substantially beyond the confines of the outer surface of the ring-shaped valve, a spring about the tubular valve secured at one end to the tubular valve, the other end of said spring engaging the ring-shaped valve, yieldably urging the head member of the tubular valve into engagement with the cylindrical extension of the ring-shaped valve; and means for reciprocating the piston.

4. A double acting shock absorber comprising in combination, a casing presenting a fluid reservoir and a cylinder; a fluid displacement member within the cylinder forming a compression chamber at each end thereof, said member having a channel in its outer surface terminating short of each end of said member, said channel cooperating with the wall of the cylinder to form a low compression passage between recesses at the respective ends of the member; valve mechanism in each piston recess, each mechanism comprising two oppositely acting valves for controlling the flow of fluid into and from said low compression passage; check valves in the fluid displacement member for establishing a fluid flow from the reservoir into the respective recesses to compensate for fluid losses in the cylinder; and means for reciprocating said fluid displacement member.

5. A shock absorber comprising in combination, a displacement chamber; a displacement member in said chamber; a fluid reservoir; and valve mechanism for controlling the flow of fluid between the said chamber and reservoir, said mechanism comprising a port surrounded by a valve seat; a valve engageable with said valve seat and providing a second valve-seat; a second valve engageable with said second valve-seat, said second valve having a shank extending through and slidably supported by the first mentioned valve; a spring yieldably maintaining the first mentioned valve upon its seat; and another spring interposed between the said first mentioned valve and the shank of the second valve to urge said second valve upon its seat.

6. A shock absorber comprising in combination, a displacement chamber; a displacement member in said chamber; a fluid reservoir; and valve mechanism for controlling the flow of fluid between the said chamber and reservoir, said mechanism comprising a port surrounded by a valve-seat; a valve engageable with said valve seat and providing a second valve-seat; a second valve engageable with said second valve seat, said second valve having a tubular shank extending through and slidably supported by the first mentioned valve; a restriction at one end of the tubular shank, providing a constant flow orifice; a spring yieldably maintaining the first mentioned valve upon its seat; and another spring interposed between the said first mentioned valve and the shank of the second valve to urge said second valve upon its seat.

EDWIN F. ROSSMAN.